United States Patent [19]

Kitamura et al.

[11] Patent Number: 4,580,136

[45] Date of Patent: Apr. 1, 1986

[54] LUGGAGE DOOR UNLOCKING DEVICE

[75] Inventors: Sotoo Kitamura, Nukata; Shigeyuki Akita; Junji Kitagawa, both of Okazaki, all of Japan

[73] Assignee: Nippon Soken, Inc., Nishio, Japan

[21] Appl. No.: 538,576

[22] Filed: Oct. 3, 1983

[30] Foreign Application Priority Data

Oct. 4, 1982 [JP] Japan ................................ 57-174191

[51] Int. Cl.[4] ................................................ H04Q 1/00

[52] U.S. Cl. .......................... 340/825.31; 340/825.69; 361/189

[58] Field of Search ....................... 340/825.69, 825.72, 340/825.31, 566, 573, 654, 644, 696, 572, 539; 455/95, 100; 361/189

[56] References Cited

U.S. PATENT DOCUMENTS

| | | | |
|---|---|---|---|
| 3,891,980 | 6/1975 | Lewis et al. | 340/825.31 |
| 3,972,038 | 7/1976 | Fletcher et al. | 455/100 |
| 4,453,161 | 5/1984 | Lemelson | 340/825.31 |

*Primary Examiner*—Donald J. Yusko

*Attorney, Agent, or Firm*—Cushman, Darby & Cushman

[57] ABSTRACT

A luggage door unlocking device for a vehicle by which a luggage door of vehicle can be unlocked without using an unlocking key is disclosed. The device includes a portable transmitter for generating an unlocking signal, a receiver which is mounted on a vehicle for receiving and discriminating the unlocking signal when the transmitter approaches the receiver and a luggage door unlocking mechanism for operating an unlocking mechanism of the vehicle when the receiver receives the unlocking signal. The transmitter has a walk detector for detecting the periodical vibrations when the person carrying the transmitter is walking which generates a walk detecting signal. Also, a switch turns on or off upon receiving the walk detecting signal from the walk detector. In the luggage door unlocking device, the transmitter having the switch which is turned off upon receiving the walk detecting signal, the transmitter begins to generate the unlocking signal just after the person carrying the transmitter stops walking so that the luggage door is automatically unlocked just after he stops walking.

12 Claims, 11 Drawing Figures

LUGGAGE DOOR UNLOCKING DEVICE

BACKGROUND OF THE INVENTION

The present invention relates to a luggage door unlocking device for a vehicle, which can unlock a luggage door of the vehicle, particularly a trunk lid without using an unlocking key.

The device of this type has a portable transmitter for generating an unlocking signal, and a receiver which is mounted on a vehicle body for receiving the unlocking signal generated by the transmitter when the transmitter approaches the vehicle, and an unlocking means for operating an unlocking mechanism of the trunk lid when said receiving means receives the unlocking signal.

According to the device of this type, the trunk lid can be automatically unlocked at the time when the person carrying the transmitter approaches the trunk lid. Therefore, when both hands are full luggage, the trunk lid can be unlocked without using a key.

However, this conventional luggage door unlocking device has a problem.

Namely, the portable transmitter of the conventional unlocking device uses a storage battery or a dry battery as an electric source. When the driver or the like of the vehicle goes out of the vehicle while carrying the transmitter, the switch of the transmitter is automatically or manually turned on. Therefore, when the person carrying the transmitter is away from the vehicle for a long period of time, the consumption of electric source is increased.

From the above circumstances, a luggage door unlocking device of which the consumption of electric source is small, has been required.

SUMMARY OF THE INVENTION

The luggage door unlocking device of the present invention includes a portable transmitter provided with an electric source and a transmitting means for generating an unlocking signal, a receiving means which is mounted on a vehicle for receiving and discriminating the unlocking signal from the transmitting means when the transmitter approaches the receiving means, and a luggage door unlocking means for operating an unlocking mechanism of the vehicle when the receiving means receives the unlocking signal.

The transmitter further includes a walk detecting means for detecting the periodical vibrations due to walking of the person carrying the transmitter and generating a walk detecting signal; and a switch which is operated upon receiving the walk detecting signal from the walk detecting means.

When the person carrying the transmitter returns to his vehicle after making purchase and enters into a predetermined unlocking signal receivable range formed about the receiving means, the luggage door is automatically unlocked immediately before or after he stops walking.

Namely, in the luggage door unlocking device provided with a transmitter having a switch which is turned on upon receiving the walk detecting signal, the luggage door is automatically unlocked before the person carrying the transmitter stops walking. In the luggage door unlocking device provided with a transmitter having a switch which is turned off upon receiving the walk detecting signal, the luggage door is automatically unlocked just after the person stops walking.

The transmitter having a switch which is turned on upon receiving the walk detecting signal can be provided with a timer circuit for continuing the "on" state of the switch for a predetermined short period of time after the walk detecting signal is terminated. In this transmitter, the luggage door is unlocked when the person carrying the transmitter approaches the receiving means of the vehicle and stops walking.

Thus, an object of the present invention is to provide a luggage door unlocking device having a portable transmitter and a receiver mounted on a vehicle, this device automatically unlocking the luggage door when the person carrying the portable transmitter approaches close to the receiver.

Another object of the present invention is to provide a luggage door unlocking device of which the electric power consumption is small.

Still another object of the present invention is to provide a luggage door unlocking device of which the electric source consumption is reduced by stopping the electric power supply to the transmitter when the person carrying the transmitter walks or stops walking outside of the vehicle.

BRIEF DESCRIPTION OF THE DRAWINGS

FIG. 2 is a front view of a walk detector;

FIG. 3 is a side view of the walk detector;

FIG. 4 is an electric circuit diagram of a portable transmitter;

FIG. 5 is a view showing the construction of a receiving means;

DETAILED DESCRIPTION OF THE EMBODIMENTS

Figure 1:
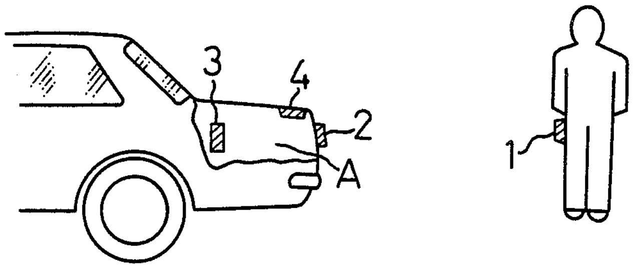
FIG. 1 is a view showing the state where the luggage door unlocking device of the present invention is used.

FIG. 1 shows the state where the luggage door unlocking device of the present invention is used. A transmitter 1 for transmitting a predetermined magnetic unlocking signal is carried by a driver. A magnetic sensor 2 is installed in the rear portion of a vehicle. The reference numeral 3 designates a box which is installed in a trunk room A for accomodating the transmitter 1. The box 3 is provided with circuitry for receiving the magnetic unlocking signal and operating an unlocking mechanism 4.

FIGS. 2 to 5 illustrate a first embodiment of the luggage door unlocking device according to the present invention.

Figure 2:
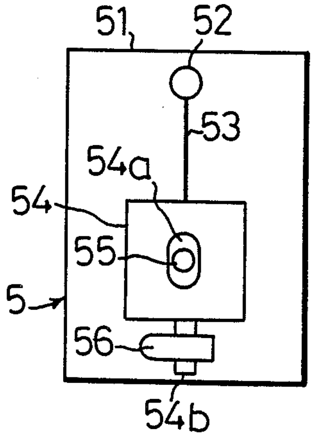
FIGS. 2 to 5 illustrate a first embodiment of the luggage door unlocking device according to the present invention.
Figure 3:
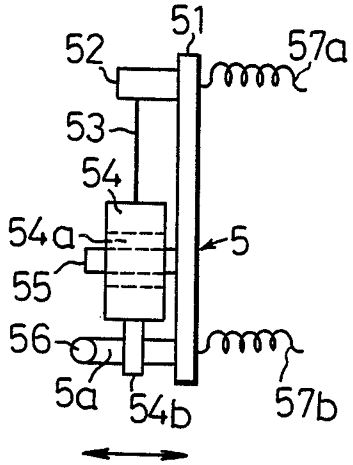

FIGS. 2 and 3 illustrate a walk detector 5. The walk detector 5 is installed within the transmitter 1 shown in FIG. 1. An insulating base plate 51 is positioned so as to extend in a substantially vertical direction when the transmitter 1 is put into a pocket of the driver 1. A support rod 52 made of conductive material is attached to the upper portion of the base plate 51. To the support rod 52, one end of a spring 53 is connected. To the other end of the spring 53, a conductive weight 54 is connected. The weight 54 acts as a pendulum which rocks due to walk of the driver. In the center of the weight 54, an elliptical hole 54*a* is formed for inserting a guide shaft 55, one end of which is secured to the base plate 51, thereinto. The guide shaft 55 guides the weight 54 so that it only rocks in the directions of arrows in FIG. 3. A conductive rod member 54*b* is attached to the weight 54 so as to project beneath it. A conductive stopper rod 56 of which the top end portion is bent like a letter L, is attached to the base plate 51. Due to the rocking movement of the weight 54, the rod member 54*b* attached to the weight 54 is periodically abutted on the bent end portion of the stopper rod 56.

To both the support rod 52 and the stopper rod 56, one end of each of the lead wires 57*a*, 57*b* is connected. When the rod member 54*b* is abutted on the stopper rod 56, the lead wires 57*a*, 57*b* are electrically connected to each other. Therefore, the stopper rod 56 and the rod-shaped member 54*b* form an electric contact 5*a*.

Figure 4:
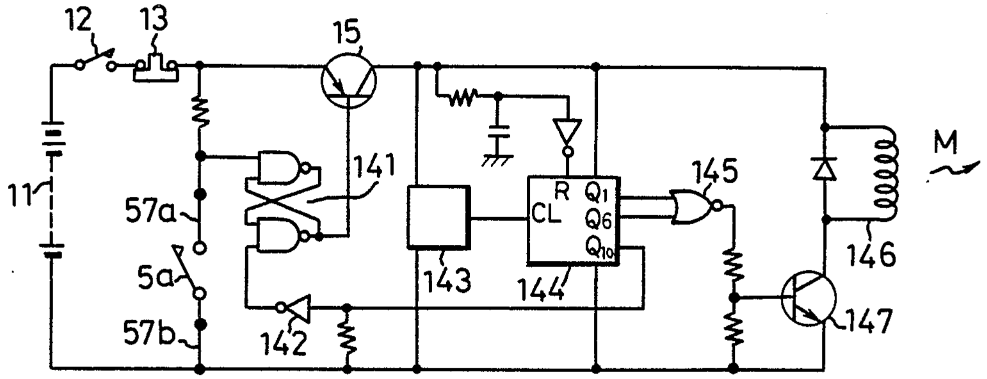

FIG. 4 illustrates a transmitting circuit for a portable transmitter 1. The transmitting circuit is constructed so that the electric power supply from the electric source is stopped when the driver stops walking. The transmitting circuit of FIG. 4 includes an electric source 11 such as a battery, a toggle switch 12 for switching on or off the electric source, a limit switch contact 13 which opens when the transmitter 1 is accomodated within the box 3 shown in FIG. 1, a transistor 15 to be used for switching, a flip-flop 141 composed of NAND gates, an oscillator 143, a binary counter 144, a transmitting coil 146 and a transistor 147. The binary counter 144 counts the clock pulse which is supplied from the oscillator 143 to the CL terminal of the binary counter 144 when the input signal of the R terminal is 0 state, and generates output signals at the output terminals $Q_1$, $Q_6$, $Q_{10}$.

The electric contact 5*a* formed by the stopper rod 56 and the rod member 54*b* of the walk detector 5 is connected to the flip-flop 141 through the lead wires 57*a*, 57*b* and generates a walk detecting signal which is on or off in response to the walk of the person carrying the transmitter 1.

The binary counter 144 acts as a timer for continuing the walk detecting signal which is on or off in response to the walk of the person carrying the transmitter 1 and continuing the supply of electric current to the transmitting coil 146 for a while after the person carrying the transmitter 1 stops walking.

Figure 5:
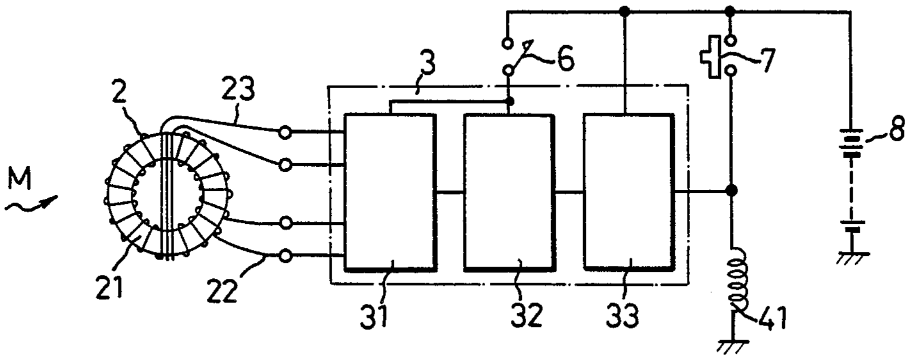

As shown in FIG. 5, the magnetic sensor 2 is formed by winding an exciting coil 22 along the annular portion of an annular magnetic core 21 and winding a detecting coil 23 in the radial direction of the magnetic core 21. The coils 22, 23 are connected to a receiving circuit 31 which is provided within the box 3 shown in FIG. 1. The receiving circuit 31 is electrically connected to a signal discriminating circuit 32. The signal discriminating circuit 32 generates an unlocking signal when the signal from the receiving circuit 31 is received. The signal descriminating circuit 32 is electrically connected to a driving circuit 33. The driving circuit 33 supplies a driving signal to the unlocking mechanism 4 shown in FIG. 1 when the driving circuit 33 receives the unlocking signal from the signal discriminating circuit 32. In FIG. 5, the reference numeral 41 designates an electromagnetic coil provided in the unlocking mechanism 4. The electromagnetic coil 41 operates an actuator for unlocking the trunk lid upon receiving the driving signal from the driving circuit 33. The reference numeral 6 designates a contact of a key switch, which is turned on when an engine is stopped, the reference numeral 7 designates a trunk open switch which is provided near a driver's seat, and the reference numeral 8 designates a battery mounted on a vehicle.

In operation, when the trunk open switch 7 is closed, voltage is directly applied to the electromagnetic coil 41 from the battery 8 so that a trunk lid is unlocked. When the transmitter 1 is taken out of the box 3 which is installed in the trunk room in the state that the toggle switch 12 shown in FIG. 4 is closed, the limit switch contact 13 is closed.

When the person carrying the transmitter 1 starts to walk, the contact 5*a* of the walking detector 5 is closed with a period corresponding to that of the rocking movement of the weight 54 so that the flip-flop 141 is reset and the output signal of the flip-flop 141 is turned 0 state so that the transistor 15 is turned ON. As a result, electric current is supplied to the transmitting coil 146 from the battery 11. At this time, the oscillator 143 starts to oscillate and supplies clock pulse signal to the counter 144. Then, from the output terminals $Q_1$ on the side of LSB and $Q_6$ on the side of MSB of the counter 144, output signals are generated with a predetermined period, respectively. The NOR gate 145 opens upon receiving the output signal from the terminal $Q_6$. While the NOR gate 145 opens, the output signal from the terminal $Q_1$ is supplied to the transistor 147 so that the transmitting coil 146 is excited to generate magnetic signal M.

When the output terminal $Q_{10}$ on the side of MSB of the counter 144 generates a count-up output signal, the flip-flop 141 is set so that the output signal thereof is turned 1 state. As a result, the transistor 15 is turned OFF to temporarily stop the electric current from being supplied to the transmitting coil 146.

If the person carrying the transmitter 1 is walking at this time, the contact 5*a* of the walk detector 5 is closed due to the rocking movement of the weight 54 so that the flip-flop 141 is reset at once. As a result, electric current is supplied to the transmitting coil 146 so that the transmitting coil 146 regenerates a magnetic signal M.

While the person carrying the transmitter 1 stops walking, the flip-flop 141 remains set upon receiving the count-up output signal. Therefore, the magnetic signal M is not generated by the transmitting coil 146.

Namely, the transmitting coil 146 continues generating a magnetic signal M for a predetermined period from the time when the contact 5*a* of the detector 5 is closed due to the rocking movement caused by the walk of the person carrying the transmitter 1 until the time when the terminal $Q_{10}$ of the counter 144 acting as a timer generates a count-up output signal. Therefore, when the person carrying the transmitter 1 stops walking for a period over a predetermined period, the generation of magnetic signal M is stopped.

When the person carrying the transmitter 1 in his pocket returns to his car after making a purchase, for example, and enters into the sensing area of the magnetic sensor 2, a magnetic signal M from the transmitter 1 reaches the magnetic sensor 2.

Thus, the transmitter 1 continues generating a magnetic signal M for a while after he stops walking.

When the magnetic signal M reaches the exciting magnetic field generated by the exciting coil 22, the detecting coil 23 generates a receiving signal in response to the magnetic signal M. The receiving signal is detected by the receiving circuit 31 and is discriminated by the signal discriminating circuit 32. If the receiving signal is the same as a predetermined signal, the electromagnetic coil 41 is excited through the driving circuit 33 so that the trunk lid is unlocked.

According to the unlocking device of the first embodiment, when the person carrying the transmitter 1 does not walk, the electric power supply from the electric source of the transmitter 1 is stopped even though the toggle switch 12 is closed. Therefore, the consumption of the electric source can be minimized.

In the first embodiment, a timer for continuing the supply of electric current to the transmitting coil 146 for a while after the person carrying the transmitter 1 stops walking can be separately provided from the timer for shaping the on-off walk detecting signal into a continuous signal. In addition, the former timer can be omitted. In this case, the receivable range of the magnetic sensor 2 is enlarged, for example so that the magnetic sensor 2 can detect the unlocking signal when the person carrying the transmitter 1 is on the way to the magnetic sensor 2.

Figure 6:
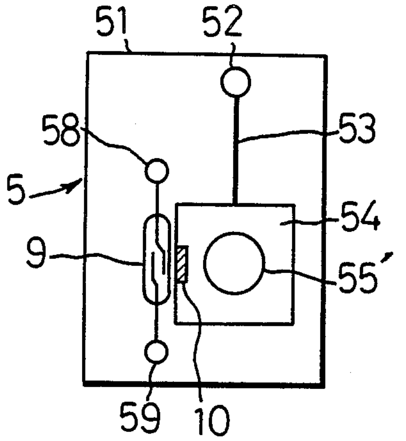
FIG. 6 is a front view of a walk detector of a second embodiment of the luggage door unlocking device according to the present invention.
Figure 7:
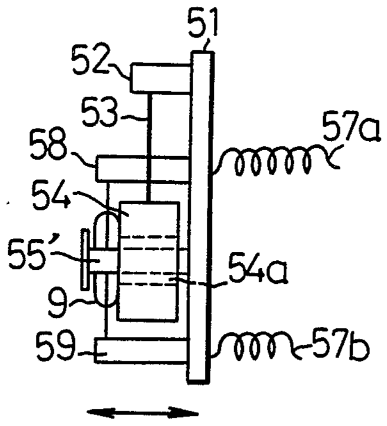
FIG. 7 is a side view of the walk detector shown in FIG. 6.

FIGS. 6 and 7 illustrate a second embodiment of the luggage door unlocking device according to the present invention. In the second embodiment, a guide member 55' is inserted into a hole 54*a* formed in the weight 54 of the walk detector 5. One end of the guide member 55' is fixed to the base plate 51 while the other end of the guide member 55' is formed into a circular stopper portion. In the side surface of the weight 54, a magnet 10 is embedded. Within the magnetic field of the magnet 10 which rocks with the weight 54 in the directions shown by arrows in FIG. 7, a lead switch 9 is provided. Both ends of the lead switch 9 are connected to conductive support rods 58, 59 respectively, each of which projects from the base plate 51. To each of the support rods 58, 59, one end of each of the lead wires 57*a*, 57*b* is connected.

The lead switch 9 opens and closes due to the rocking movement of the magnet 10 caused by the walk of the person carrying the transmitter 1. The contact signal of the lead switch 9 is supplied to the transmitting circuit (shown in FIG. 4) of the transmitter 1 through the lead wires 57*a*, 57*b*.

The device of the second embodiment has operation effect substantially equal to that of the first embodiment.

Figure 8:
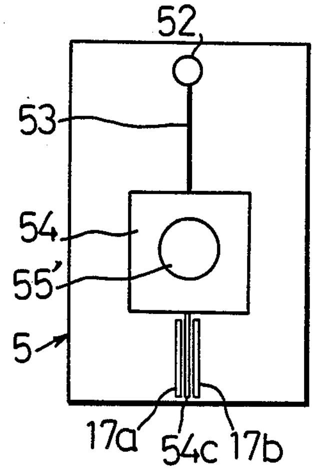
FIG. 8 is a front view of a walk detector of a third embodiment according to the present invention.
Figure 9:
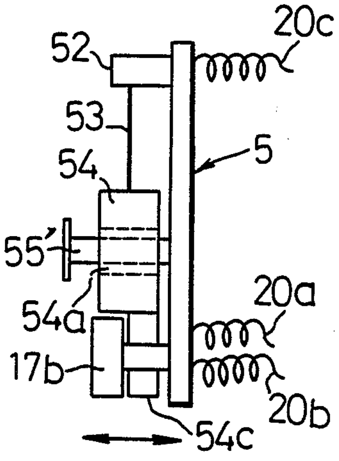
FIG. 9 is a side view of the walk detector shown in FIG. 8.
Figure 10:
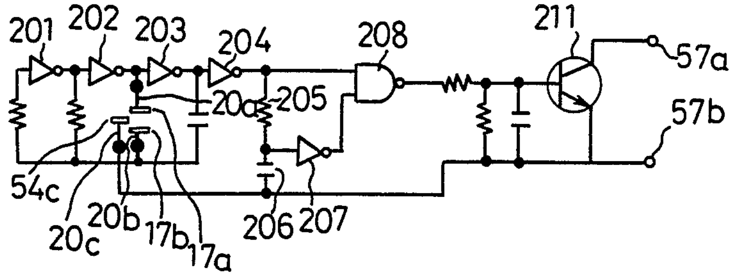
FIG. 10 is an electric circuit diagram of the walk detector of a third embodiment.

FIGS. 8 to 10 illustrate a third embodiment of the luggage door unlocking device according to the present invention. In FIGS. 8 and 9, the weight 54 of the walk detector 5 is provided with an electrode plate 54*c* which projects downward. Electrode plates 17*a*, 17*b* each of which is coated with insulating material are provided so as to be opposed to each other through a space. The electrode plate 54*c* enters into and goes out of the space formed between the electrode plates 17*a*, 17*b* due to the rocking movement of the weight 54. To each of the electrode plates 17*a*, 17*b*, one end of each of the lead wires 20*a*, 20*b* is connected. To the support rod 52, a lead wire 20*c* is connected. The lead wire 20*c* is electrically connected to the electrode plate 54*c* through the spring 53 and the weight 54. The electrode plates 17*a*, 17*b*, 54*c* are connected to the electric circuit shown in FIG. 10 through the lead wires 20*a*, 20*b*, 20*c*, respectively.

In FIG. 10, inverters 201, 202, 203, 204 compose an oscillating circuit. The oscillating frequency of the oscillating circuit is decreased as the electrostatic capacity between the electrode plates 17*a*, 17*b* is increased.

The electrostatic capacity is small when the electrode plate 54*c* is positioned between the electrode plates 17*a*, 17*b* and is large when the electrode plate 54*c* is not positioned therebetween. Therefore, the oscillation frequency of the oscillation circuit, namely, the output frequency of the inverter 204 varies as the position of the electrode plate 54*c* relative to the electrode plates 17*a*, 17*b* varies.

A resistor 205, a condensor 206, an inverter 207 and a NAND gate 208 compose a frequency discriminating circuit in FIG. 10. When the output frequency of the inverter 204 is increased over a predetermined frequency, the output signal of the NAND gate 208 is turned "1" state and a transistor 211 is turned ON. The switching transistor 211 is connected to the transmitting circuit (shown in FIG. 4) of the transmitter 1 by means of the lead wires 57*a*, 57*b*.

When the electrostatic capacity between the electrode plates 17*a*, 17*b* varies due to the rocking movement of the electrode plate 54*c* (in the directions shown by arrows in FIG. 9) caused by the walk of the person carrying the transmitter 1, the output frequency of the inverter 204 periodically varies in accordance with the rocking movement of the electrode plate 54*c*. As a result, the transistor 211 is repeatedly turned ON and OFF.

The third embodiment has operation effect substantially equal to that of the first embodiment.

Figure 11:
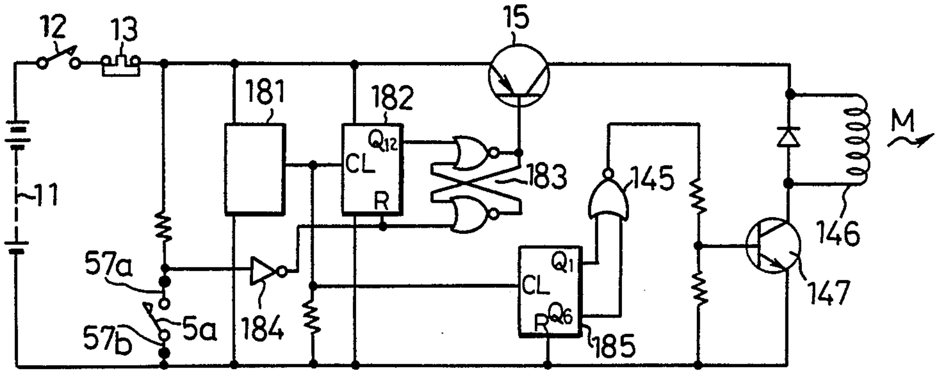
FIG. 11 is an electric circuit diagram of a portable transmitter of a fourth embodiment of the luggage door unlocking device according to the present invention.

FIG. 11 illustrates a transmitting circuit of a fourth embodiment of the present invention. The transmitting circuit of the fourth embodiment, stops the electric power supply from the electric source of the transmitter 1 while the person carrying the transmitter 1 walks. The reference numeral 181 designates an oscillator, the reference numerals 182, 185 designate counters and the reference numeral 183 designates a flip-flop composed of NOR gates.

While the person carrying the transmitter 1 walks, the contact 5*a* of the walk detector 5 is periodically closed so that the counter 182 acting as a timer is periodically reset and the output signal of the flip-flop 183 is turned to a 1 state. As a result, the transistor 15 is turned OFF so that electric power supply to the transmitting coil 146 is stopped.

When he stops walking, the contact 5*a* remains open so that the input signal of the terminal R of the counter 182 remains at a 0 state. As a result, the counter 182 generates a count-up output signal from the output terminal $Q_{12}$ thereof. Therefore, the output signal of the flip-flop 183 is turned to a 0 state so that the transistor 15 is turned ON. As a result, the electric power supply to the transmitting coil 146 is started and the transmitting coil 146 is excited by the signals supplied from the output terminals $Q_1$, $Q_6$ of the counter 185 so that the magnetic signal M is generated by the transmitting coil 146. The count-up period of the counter 182 is made longer than the walk period of the person carrying the transmitter 1.

Therefore, when the transmitter 1 is put in the pocket or the like of a driver or the like enters into the sensing range of the electric sensor 2 when thereafter he stops walking, the transmitter 1 generates a magnetic signal M so that the trunk lid is unlocked.

As described above, the luggage door unlocking device of the present invention detects the rocking movement of the transmitter due to the walk of the person carrying the transmitter and automatically stops the electric power supply from the electric source of the transmitter while he walks or stops walking. Therefore, the consumption of electric source, which is increased while the person carrying the conventional transmitter is away from his car for a long period of time, can be extremely reduced.

What is claimed is:

1. A luggage door unlocking device for a vehicle, comprising:

a portable transmitter comprising:

(a) an electric source, (b) walk detecting means for detecting periodic vibrations caused by the walking of a person carrying said transmitter and generating a walk detecting signal indicative thereof, (c) an electric source switch which changes state upon receiving the walk detecting signal, and (d) transmitting means, responsive to said source through said switch, for generating an unlocking signal in response to said state change of state of said source switch;

said portable transmitter having a limited transmission range:

receiving means mounted on the vehicle for receiving the unlocking signal when said receiving means is within said range of said transmitter; and unlocking means for operating an unlocking mechanism of a luggage door of the vehicle when said receiving means receives the unlocking signal.

2. A luggage door unlocking device according to claim 1, wherein:

said transmitting means includes an electromagnetic coil for generating a magnetic unlocking signal; and said receiving means includes a magnetic sensor for receiving the magnetic unlocking signal generated by said transmitting means.

3. A luggage door unlocking device according to claim 1, wherein:

said electric source switch is turned on upon receiving the walk detecting signal; and said transmitter further comprises a timer which initiates a timing sequence when said walk detecting means stops generating the walk detecting signal and keeps said electric source switch on until a predetermined time expires.

4. A luggage door unlocking device according to claim 1, wherein:

the walk detecting signal generated by said walk detecting means is a signal which is periodically on and off and of which the state changes simultaneously with the periodic vibrations due to the walk of the person carrying said transmitter.

5. A luggage door unlocking device according to claim 4, wherein:

said walk detecting means comprises:

a pendulum which rocks due to the periodic vibrations caused by the walk of the person carrying said transmitter; and switching means for generating the periodic signal corresponding to the rocking movement of said pendulum.

6. A luggage door unlocking device according to claim 5, wherein:

said switching means comprises a first switch contact provided in said pendulum, and a second switch contact provided in the path of said pendulum to be in contact with said first switch at a point in the path of the pendulum.

7. A luggage door unlocking device according to claim 5, wherein:

said switching means comprises a permanent magnet provided in said pendulum, and a lead switch provided along the path of said pendulum and which changes state when said pendulum is positioned at a predetermined rocking position.

8. A luggage door unlocking device according to claim 5, wherein:

said switching means comprises a first electrode provided in said pendulum, a second electrode which is provided along the path of said pendulum opposed to said first electrode, a RC (Resistor-Capacitor) oscillating circuit connected to said first and second electrodes for generating an output signal having an oscillation frequency which changes due to the capacitance change of a capacitor formed by said first and second electrodes, said capacitance change being caused by the rocking movement of said pendulum, and a transistor which conducts when the oscillation frequency of said oscillating circuit is within a range of predetermined frequencies.

9. A luggage door unlocking device according to claim 3, wherein:

the walk detecting signal generated by said walk detecting means is a signal which is periodically on and off and of which the state changes simultaneously with the periodic vibrations due to the walk of the person carrying said transmitter;

the set time of said timer is longer than the period of said vibrations; and said timer is reset upon receiving the walk detecting signal.

10. A luggage door unlocking device according to claim 4, wherein:

said electric source switch is turned off upon receiving the walk detecting signal; and said transmitter further comprises a timer for forming a continuous signal based on the walking detecting signal, said timer being, reset in every vibratory period of said walk detecting signal and said timer keeping said electric source switch off until the set time which is longer than the period of vibrations expires.

11. A device as in claim 1 wherein said electric source is a battery.

12. An automatic door unlocking device, comprising:

a portable transmitter including:

(a) pendulum means for oscillating in response to movement of a person;

(b) means for detecting said movement of said pendulum means;

(c) transmitter means for transmitting a signal; and (d) power source means for applying power to said transmitter means when said movement is detected by said means for detecting;

receiver means for receiving said signal and producing a signal indicative thereof;

unlocking means electrically coupled to said receiver means for unlocking said door when based on said indicative signal from said receiver means.

* * * * *